W. J. BURCHETT.
LEVER ADJUSTMENT.
APPLICATION FILED OCT. 17, 1919.

1,409,922. Patented Mar. 21, 1922.

Inventor
Walter J. Burchett
By Percy B Hills
Attorney

UNITED STATES PATENT OFFICE.

WALTER J. BURCHETT, OF EAST ORANGE, NEW JERSEY, ASSIGNOR, BY MESNE ASSIGNMENTS, TO H. EMERSON COMINGS.

LEVER ADJUSTMENT.

1,409,922. Specification of Letters Patent. Patented Mar. 21, 1922.

Original application filed May 28, 1919, Serial No. 300,365. Patent No. 1,339,844, dated May 11, 1920. Divided and this application filed October 17, 1919. Serial No. 331,455.

*To all whom it may concern:*

Be it known that I, WALTER J. BURCHETT, a citizen of the United States, residing at East Orange, county of Essex, State of New Jersey, have invented certain new and useful Improvements in Lever Adjustments, of which the following is a specification.

My invention relates to means for adjustably attaching the operating arm or lever of a power mechanism to a shaft for the purpose of imparting oscillatory or other movement to said shaft, and is a division of an application filed by me May 28, 1919, Serial No. 300,365.

The main object of this invention is to provide a simple and efficient means for adjusting said arm with respect to said shaft, so that the device is adapted for use with various forms of machinery and in any desired position.

In the accompanying drawing:—

Similar numerals of reference denote corresponding parts in the two views.

Figure 1:
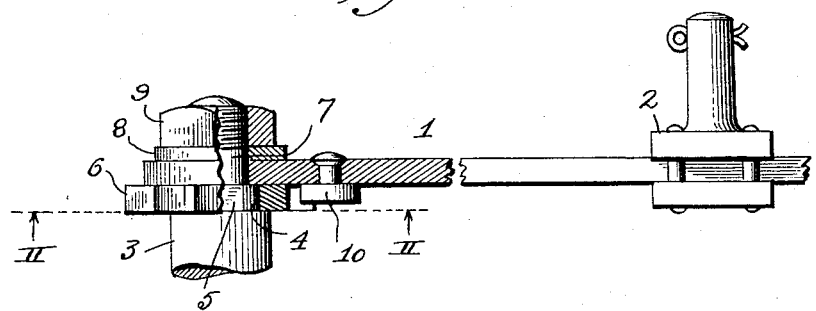
Figure 1 is a side elevation partly broken away of my improved arm applied to a shaft to be operated.
Figure 2:
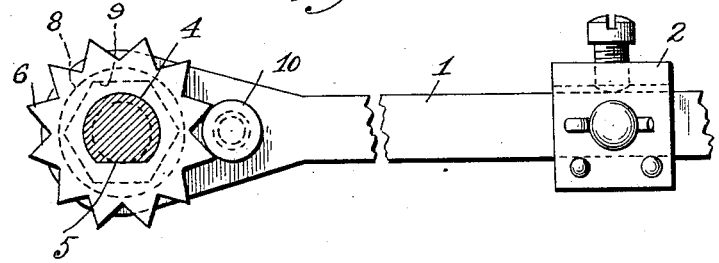
Figure 2 is a horizontal sectional view of the same, taken on the line II—II of Figure 1.

In the said drawing, the reference numeral 1 denotes the operating arm or lever having adjustably mounted at its outer end a suitable fastening device 2, whereby it is adapted to be connected to some operating part of the machine by which it is operated. The shaft 3 to be operated by said lever is reduced near its upper end at 4, said reduced portion being provided with a flattened side 5 removably to receive a star wheel 6, said star wheel being apertured to conform to the contour of the portion 4 of said shaft, as best seen in Figure 2. The upper end of the shaft 3 is still further reduced at 7 and is screw-threaded at its upper end, said reduced portion 7 receiving the inner end of the lever 1, the latter when in position resting upon the star wheel 6. Disposed above the lever 1 on the reduced portion 7 is a washer 8, all of these parts being retained in position by a nut 9 engaging the screw-threaded upper end of the reduced portion 7. Riveted or otherwise fixed to the lever 1 is a lug 10, adapted, when the lever is in position on the shaft 3, to engage between any two of the teeth of the star wheel 6, as shown in Figure 2, thereby locking said lever and star wheel in such position.

The device when adjusted to the position shown in the drawing is particularly well adapted for transmitting a vibratory motion imparted to the lever 1 from any suitable machine to the shaft 3, but frequently it is found desirable that the position of the lever 1 with respect to the shaft 3 be shifted in order to suit different forms of machines from which operation is imparted. This readily can be accomplished by loosening the nut 9 sufficiently to permit the lever 1 to be raised far enough to disengage the lug 10 from the teeth of the star wheel 6. Said lever then may be moved radially so that the lug 10 will engage between any other two of the teeth of the star wheel 6, and upon being dropped to position therebetween again may be clamped by resetting the nut 9.

In my application for Letters Patent No. 300,365, I have shown this device applied to a counting mechanism, for which it is particularly well adapted. But it will be understood that it is not limited to any such use, as it may be applied to any character of device wherein an adjustment of the lever 1 with respect to the shaft 3 may be desired.

Having thus described my invention, what I claim as new and desire to secure by Letters Patent, is:—

In a device of the character described, a rotatable shaft having a reduced end irregularly shaped, a star wheel apertured to conform to the irregular shape of said end and adapted detachably to fit thereon, a lever adapted to be oscillated, and a lug fixed to said lever and adapted to be engaged between any two of the teeth on said star wheel, whereby said lever may be shifted in its operating engagement with said shaft.

In testimony whereof, I hereunto set my hand this 14th day of October, 1919.

WALTER J. BURCHETT.